United States Patent Office 3,148,480
Patented Sept. 15, 1964

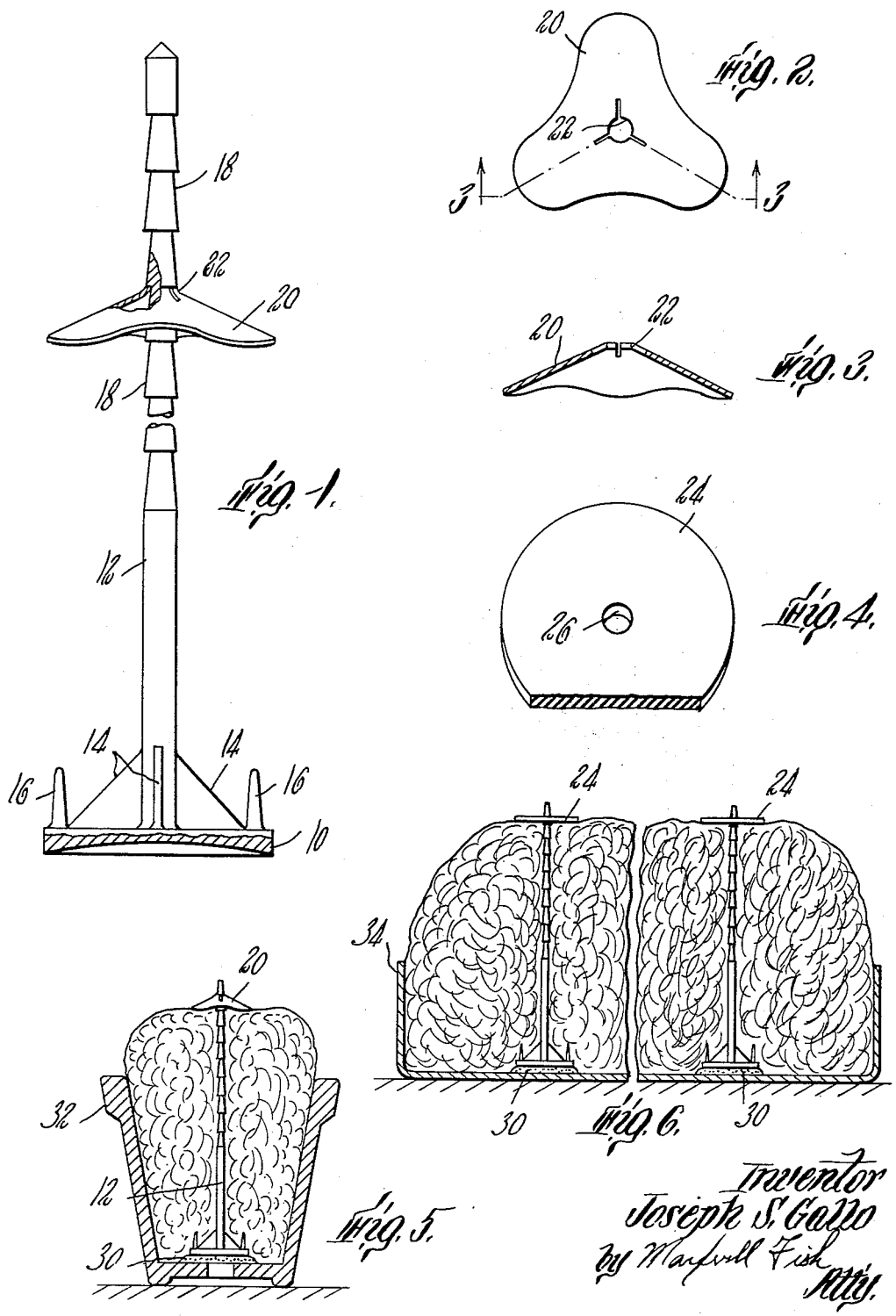

3,148,480
FOAM ANCHOR
Joseph S. Gallo, 938 East St., Walpole, Mass.
Filed Dec. 3, 1963, Ser. No. 327,721
3 Claims. (Cl. 47—41.12)

The present invention relates to a foam anchor for maintaining sponge foam and similar loosely compacted water absorbent materials in position for support of water demanding elements of flower arrangements including cut flower and leaf stems and the like.

The sponge foam which is widely used by florists for the support or cut flowers in flower arrangements is a loosely compacted, sponge-like and extremely water absorbent material well adapted for use under a wide variety of conditions, in pots and in trays, where, for example, the material may be molded and pyramided into any desired shape. When moistened the material tends to expand very substantially and if not held firmly in position loses much of the compact texture required for the firm support of the flower stems thrust into the mass for support.

It is a principal object of the invention to provide a foam anchor which is simple and efficient in construction and well adapted for holding firmly in position the loosely compacted water absorbent material employed for supporting the stems of cut flowers in flower arrangements.

More specifically it is an object of the invention to provide a foam anchor suitable for confining and supporting sponge foam and similar materials for use in flower arrangements in a wide variety of locations and of molded forms into which the material may be built up or pyramided above the edges of the container to permit insertion of flower stems into the material at widely varying angles.

With these and other objects in view the several features of the invention will be readily apparent from the following description taken in connection with the accompanying drawings in which:

FIG. 1 is a view in elevation of a foam anchor embodying therein the several features of the invention;

FIG. 2 is a plan view of the hold-down cover supported for vertical adjustment on the post;

FIG. 3 is a detail side view in section of the holddown cover shown in FIG. 2;

FIG. 4 is a perspective view of another form of cover suitable for use with the foam anchor;

FIG. 5 is a sectional view illustrating the application of the foam anchor to maintain the sponge foam in its compacted form in a flower pot; and FIG. 6 is a further illustration showing an application of the foam anchor to maintain a large mass of sponge foam in a molded position in a flat tray as, for example, in the assembly of a casket saddle.

The foam anchor here shown in a preferred form as embodying the several features of the invention comprises an integrally formed base 10 and post 12 molded as a unit from plastic material, the attachment of the base to the post being reinforced by four vertically disposed triangular struts 14 spaced at 90° apart about the post and base. In addition to strengthening the post the struts act as fins to prevent turning or twisting of sponge foam packed about the foam anchor. Optionally the base may have formed therein two vertical pins 16 which extend upwardly from the base adjacent the tips of two opposed strus 14. The pins projecting into the mass of the packed material serve to fix still more securely the position thereof with relation to the post. The bottom surface of the base 10 is slightly concaved to receive a mastic for attachment to the bottom surface of a flower arrangement container.

The post 12 is formed at closely spaced intervals along its length with circular cover hold-down grooves 18 which may be pyramidal in shape, each tapered surface at its upper end abutting the enlarged base of the next succeeding tapered surface to form therewith an outwardly projecting hold-down edge. It is assumed that the post may, for example, be ⅛" in diameter. The hold-down edges of the grooves are preferably spaced from one another ¼" to ½" apart along the length of the stem.

The foam anchor is provided with a hold-down cover which is adjustable downwardly on the stem 12 to a position in which the foam material is firmly pressed and compacted and is locked against upward movement relative to the stem. FIGS. 1, 2, 3 and 5 illustrate one form of hold-down cover 20 which takes the form of a conically shaped member having a roughly triangular outer edge approximately one inch in diameter and a central circular aperture of a diameter preferably slightly less than the largest diameter of the tapered grooved portion 18 of the post. The aperture is formed with three radial outwardly extending slits equally spaced from one another so that the holding surface or rim of the aperture is divided into three resilient segments 22. The hold-down cover 20 may be made of any suitable material such as plastic, or metal, or rubber.

FIGS. 4 and 6 illustrate an alternative form of hold-down cover 24 which is made of rubber, takes the form of a flat disc approximately an inch in diameter, and is formed with a central circular aperture 26 gaged to provide a tight fit between the post 12 and the hold-down cover 24. The edge of the circular aperture 26 tends to expand and then to contract slightly as the hold-down cover 24 is pressed downwardly causing the cover to be held downwardly in its adjusted foam holding position by the engagement of the edge of the aperture 26 with the enlarged base of the next upwardly adjacent tapered section of th post.

The slightly concaved bottom surface of the base 10 is covered with a mastic 30 having the characteristic that it will stick firmly to the plastic material of which the post and base element are made and also to the surface of an ordinary earthenware, plastic or metal container in which the sponge is to be placed. A mastic employed must be substantially impervious to water so that the assembly will continue to be held firmly in position when the sponge foam is soaked with water.

The foam anchor above described is assembled in position and utilized to hold down the sponge foam forming part of a flower arrangement in the following manner:

As shown in FIG. 5 the anchor element comprising the stem 12 and base 10 coated with the mastic 30 is pressed firmly against the bottom of the pot 32 of FIG. 5 so that it is held firmly in position by the mastic. The sponge foam is then packed firmly into the pot and about the base 10 and lower portion of the post 12, so that it is in intimate contact with the smaller positioning pins 16 and ribs 14. The material may be pyramided substantially above the rim of the pot as shown in FIG. 5 permitting flower stems to be thrust into the foam at widely different angles. The cover 20 is then placed over the upper end of the post and is pushed downwardly until the adjacent portions of the sponge foam are pressed firmly into engagement with the pins 16, ribs 14 and also against surrounding portions of the container bottom and sides. The edges of the aperture segments 22 are forced outwardly slightly during the downward adjusting movement of the cover 20 passing over successive ring tapers until the cover 20 reaches a position in which the sponge foam is deemed to be firmly held. The cover remains firmly locked in this depressed position by the engagement of the resilient segments 22 of the aperture against the sharply angled upper edges or faces of the respective grooves. The sponge foam is now held firmly between the base 10 including the upwardly extending pins 16 and ribs 14, and the conically shaped hold-down cover 20. Finally, the sponge foam is moistened preparatory to receiving the elements of a flower arrangement including the stems of cut flowers, greenery and the like. In the event that the post is taller or longer than needed, the post is easily shortened by breaking off any desired length of the post at the point of smallest diameter between any two tapered sections of the post.

FIG. 6 illustrates a particular application of the foam anchor for holding in position a substantial and largely unsupported mass of sponge foam arranged for use as a casket saddle. The container 34 is a tray which may, for example, be a foot long, eight inches wide and two inches in height. The sponge foam is massed in the tray to a substantial height so that flower stems may be inserted therein at any angle from the horizontal to the vertical. Two foam anchors are employed to press down and to hold the foam mass firmly in position. It will be understood that any desired number of anchors may be employed depending upon the size and shape of the sponge foam mass to be supported.

It will be understood that while the foam anchor which forms the subject matter of the invention is particularly adapted for confining and supporting sponge foam employed as a base for cut flowers in flower arrangements, the anchor may equally well be employed for confining and supporting other similar loosely compacted, lightly adhering, water absorbent materials to provide a base for flower arrangements.

The invention having been described, what is claimed is:

1. An anchor for confining and supporting a piled up mass of loosely compacted, lightly adhering, water absorbent material for the support of cut flowers and the like in flower arrangements which comprises, in combination, a combined base and post element formed integrally from molded plastic material including a flanged base having a bottom holding surface, a cylindrical post about which said material is packed upstanding from said base and having formed therein a series of closely spaced annular locking grooves, a plurality of vertically disposed post supporting and material holding fins connecting the base with the post at spaced intervals around the post, and a mastic applied to said bottom holding surface, and a cover having a centrally disposed aperture with a resilient inner edge thereof closely fitted to said post, said cover being downwardly adjustable to a series of material pressing positions self-locking against upward movement from any one of said grooves.

2. An anchor for confining and supporting a piled up mass of loosely compacted, lightly adhering, water absorbent material for the support of cut flowers and the like in flower arrangements which comprises, in combination, a combined base and post element formed integrally from molded plastic material including a flanged base having a slightly concaved bottom holding surface, a cylindrical post about which said material is packed upstanding from said base and having formed therein a series of annular upwardly, inwardly tapered surfaces, each said tapered surface terminating in the enlarged base of the next above tapered surface, a plurality of vertically disposed triangular post supporting and material holding fins connecting the base with the post at spaced intervals about the post, and a plurality of material engaging pins upstanding from said base adjacent the outer periphery thereof at spaced intervals about the base, and a mastic applied to said bottom holding surface, and a cover having a centrally disposed aperture with a resilient inner edge thereof closely fitted to said post, said cover being downwardly adjustable to a series of material pressing positions self-locking against upward movement from one to the next tapered surface.

3. A supporting base for flower arrangements having, in combination, a container, a piled up mass of loosely compacted, lightly adhering, water absorbent material for the support of cut flowers and the like in said container, and an anchor for said mass which comprises a combined post and base element including a flanged base having a bottom holding surface attached to the bottom of said container by a mastic applied between said bottom holding surface and bottom of the container, a cylindrical post about which said material is packed upstanding from said base and having formed therein a series of closely spaced annular locking grooves, a plurality of vertically disposed post supporting and material holding fins connecting the base with the post at spaced intervals around the post, and a cover having a centrally disposed aperture with a resilient inner edge thereof closely fitted to said post, said cover being downwardly adjustable to a series of material pressing positions self-locking against upward movement in each of said grooves.

References Cited in the file of this patent

UNITED STATES PATENTS

| | | |
|---|---|---|
| 649,697 | Klocker | May 15, 1900 |
| 1,989,952 | Thomas | Feb. 5, 1935 |
| 2,984,045 | Eggan | May 16, 1961 |